Feb. 18, 1930.  R. W. BRADEN ET AL  1,748,009
LOCOMOTIVE DRIFTING VALVE
Filed Nov. 6, 1925  6 Sheets-Sheet 2

Inventors
R. W. Braden,
C. Stern,
By Mawhinney & Mawhinney
Attorneys

Patented Feb. 18, 1930

1,748,009

UNITED STATES PATENT OFFICE

RICHARD W. BRADEN, OF NEW YORK, N. Y., AND CHARLES STERN, OF JERSEY CITY, NEW JERSEY, ASSIGNORS, BY MESNE ASSIGNMENTS, TO ARDCO MANUFACTURING COMPANY, OF HOBOKEN, NEW JERSEY, A CORPORATION OF DELAWARE

LOCOMOTIVE DRIFTING VALVE

Application filed November 6, 1925. Serial No. 67,325.

The present invention relates to improvements in locomotive drifting valves and consists in certain improvements and developments of the general type of drifting valve shown and described in our prior patents as follows:—1,499,637, July 1, 1924; 1,512,646, October 21, 1924; 1,709,057, April 16, 1929; 1,539,339, May 26, 1925; 1,628,478, May 10, 1927; 1,594,077, July 27, 1926.

The present invention consists in certain refinements in the manufacture and assembly of the parts by virtue of which the cost of production is lowered, greater ease is secured in the manufacture of the castings and a more reliable operation secured.

Further objects of the invention are to produce the casting in sections to facilitate the molding thereof, to provide for the holding of the vacuum-relieving steam shut off blocks in closed position during slow running of the locomotive and to insure that these shut off blocks remain open throughout the drifting period.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
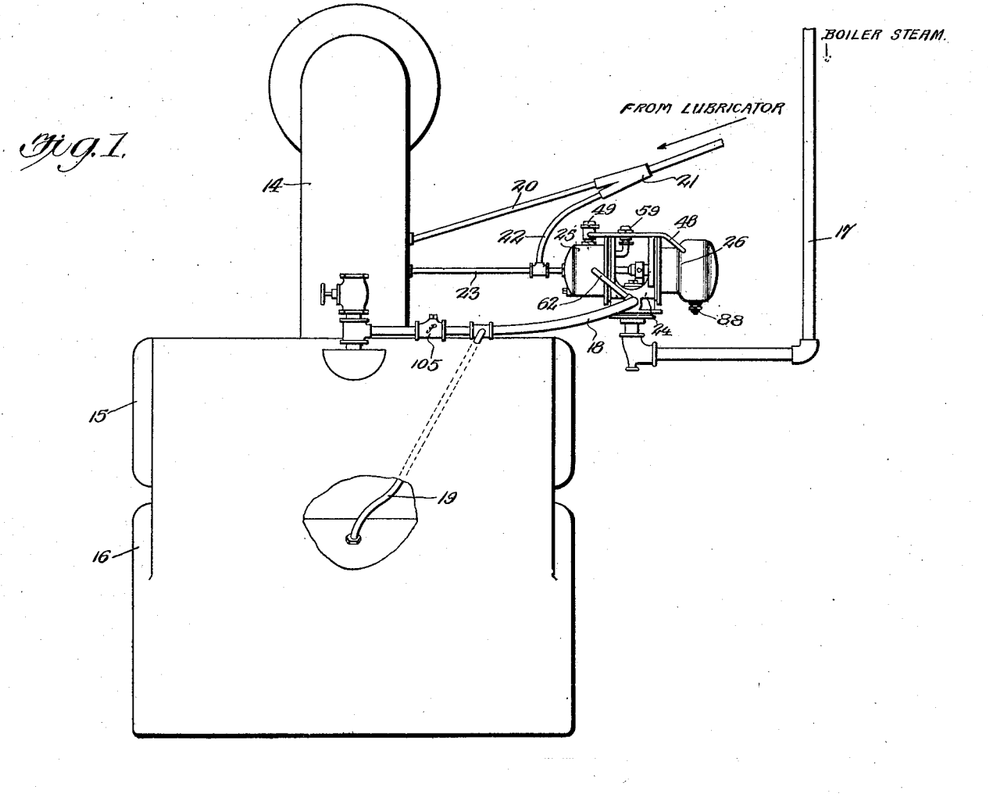
Figure 1 is a diagrammatic view showing the improved device as applied to a locomotive steam supply pipe, steam chest and cylinder.
Figure 2:
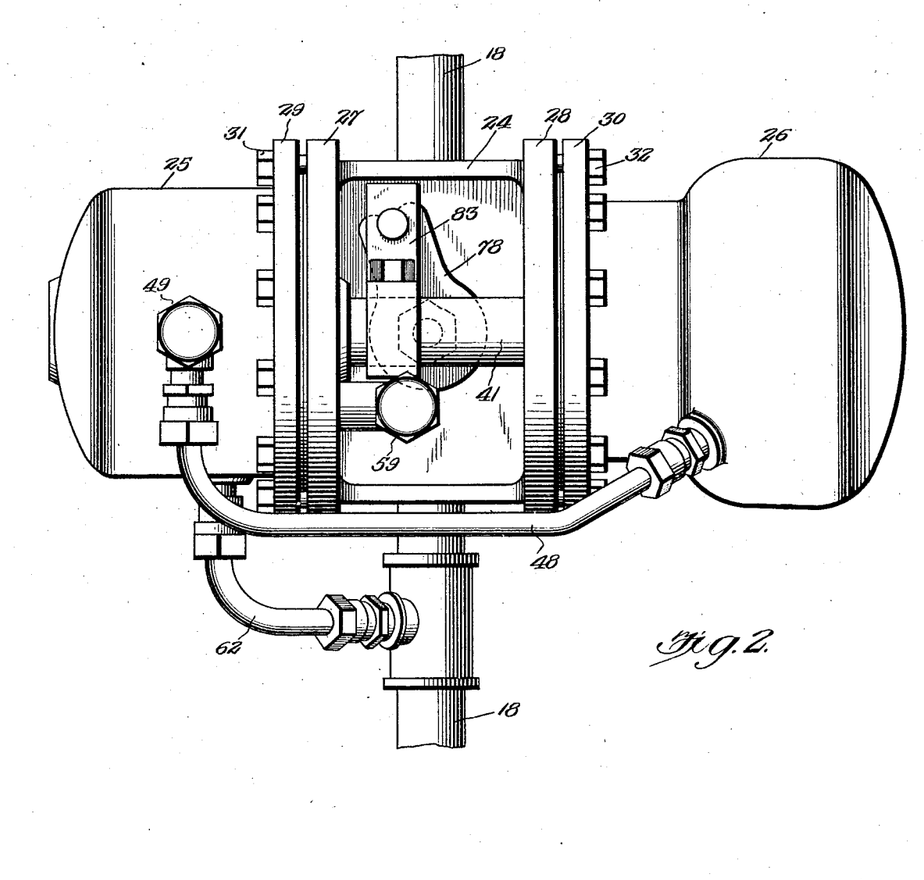
Figure 2 is a top plan view of a drifting valve on an enlarged scale.

Referring for the present to Figure 1, 14 designates the steam supply pipe of the locomotive, 15 the steam or valve chest and 16 one of the locomotive cylinders.

The improved drifting valve is shown as placed in communication with the dome of the boiler or with other source of saturated steam supply by the pipe 17. This pipe connects with the central portion of the drifting valve casing and with a steam supply chamber or cylinder therein as hereinafter described. Valves or shut-off blocks are mounted in this chamber or feed cylinder and control the passage of the saturated steam to the steam chests 15 and cylinder through the pipes 18. It will be understood that two pise such as 18 are employed extending to opposite steam chests. A pipe 19 is connected between the pipe 18 and the cylinder 16. This pipe 19 carries the boiler steam directly to the cylinder of the locomotive which exhausts through the stack.

At 20 is represented the lubricant pipe of the locomotive, known generally as a lubricator pipe in use on all locomotives. The pipe 20 extends down from the lubricator to the steam supply pipe 14 and in the present instance a Y-coupling or T-coupling 21 is used to connect the branch lubricator pipe 22 to the pipe 20. The branch pipe 22 is coupled to the pipe 23 extending between the locomotive steam supply pipe 14 and the large cylinder of the drifting valve.

Referring now to the other figures of the drawings the casing for the drifting valve, instead of being made up in one casting as heretofore, is composed of the three castings, namely the central casting 24 and the two end castings 25 and 26. The central casting is made with the flanges 27 and 28, the end casting 25 having a flange 29 to mate with the flange 27 and the other end casting 26 having the flange 30 acting as a complement to the other flange 28 of the central casting 24. Series of bolts 31 and 32 are passed through the flanges and act to secure the castings together but permitting of the separation thereof when desired.

Figure 4:
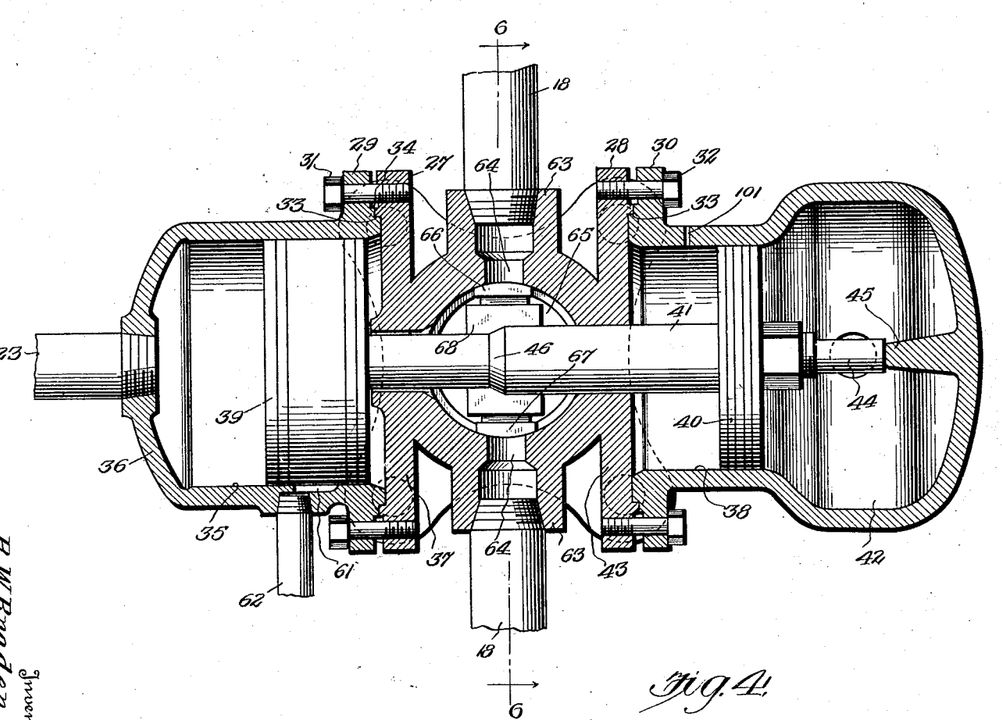
Figure 4 is a longitudinal horizontal section with the parts shown in normal running position taken on the line 4—4 in Figure 3.
Figures 5, 10, 11:
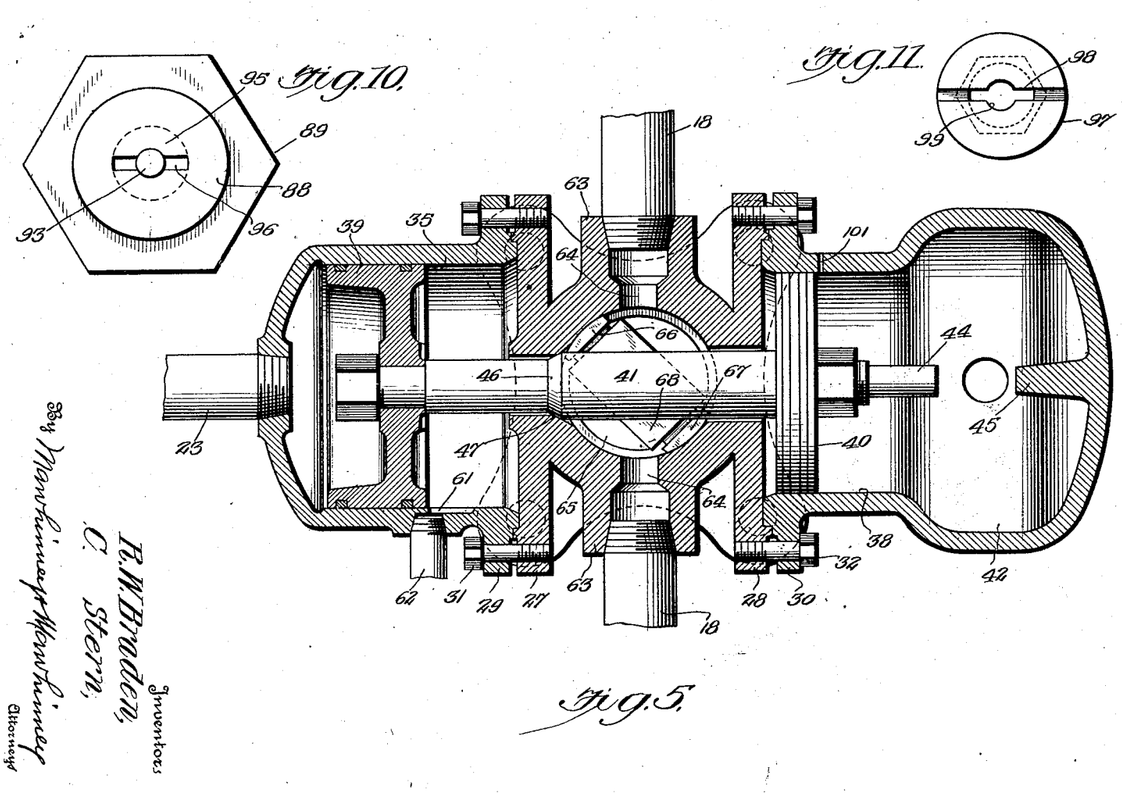
Figure 5 is a similar section with the parts in the drifting position.
Figure 10 is a bottom plan view of the same.
Figure 11 is a bottom plan of the nut at the top portion of the condensation check casing.

In Figures 4 and 5 the flange 29 is shown with the groove or recess 33 to receive the rib 34 of the companion flange 27. The rib and groove arrangement provide for centering the various castings. In the end casting 25 is a large cylinder 35 having its outer head 36 perforated centrally and screw threaded to receive the pipe 23 connecting with the locomotive steam pipe 14. The inner end of the cylinder 35 is closed by the detachable head 37 forming part of the intermediate casting 24.

The other end casting 26 contains a cylinder 38 of smaller diameter as compared with the cylinder 35 and these two cylinders are coaxial whereby the pistons 39 and 40, which are mounted to reciprocate respectively in the larger and smaller cylinders, may be connected together for simultaneous movement by the piston rod 41. The smaller cylinder 38 communicates at its outer end with a steam pressure chamber 42. At its inner end the cylinder is closed by the removable head 43 forming part of the intermediate casting. An extension 44 of the piston rod 41 projects into the steam pressure chamber 42 and coacts with the fixed abutment 45 therein for the purpose of arresting the movement of the pistons and rod as hereinafter explained.

Figure 8:
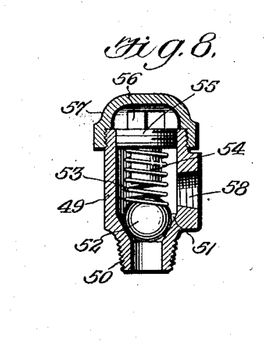
Figure 8 is a vertical section taken through the non-return and pressure checks.

The piston rod 41 is made of differential diameters providing therebetween the shoulder or conical seat 46 adapted to close against the similarly formed seating surface 47 upon an adjacent portion of the intermediate casting. The piston rod fits rather loosely through the heads 37 and 43, as indicated in Figure 5 so as to permit free breathing in the inner portions of the cylinders but steam is trapped in the inner end of the larger cylinder when the valve portion 46 engages the seating 47. The large cylinder 35 communicates with the steam pressure chamber 42 by an external pipe 48, forming no part of the castings but being independent thereof. The pipe 48 makes its connection to the larger cylinder through the check valve shown more particularly in Figure 8 and housed in the casing 49 having the threaded nipple 50 by which it is removably screwed into the cylinder wall. Above the nipple and internally of the casing is the valve seat 51 against which is adapted to close the ball valve 52 urged downwardly against the seat by the coil spring 53. The spring is wound at its upper end about the shank 54 of the adjusting screw 55 threaded in the upper portion of the valve casing and having the square or other head 56 to receive an implement for the authorized rotation and adjustment thereof. By turning the plug or screw 55 in the one or the other direction, the coil spring may be put under greater or lesser pressure and the valve 52 may be regulated to lift at various degrees of pressure within the large cylinder. A bonnet or cover 57 is screwed upon the casing to conceal the adjusting plug. A threaded opening 58 is made in one side of the casing above the valve seat to receive the pipe 48. A similar relief valve 59 is placed in communication with the inner portion of the large cylinder 35 as by the elbow 60. In this case the opening in the side wall of the casing may be simply left open to the atmosphere and the spring so regulated that a pressure not exceeding a predetermined minimum will obtain in the inner portion of the larger cylinder. This will be explained more in detail hereinafter.

As shown in Figure 5 a port 61 is made in the side of the larger cylinder 35, this port being so located as to be closed by the larger piston 39 when in the inner position but unmasked when in the outer position. The port 61 is connected by the pipe 62, which is also an external pipe, forming no part of the casting, with one of the two pipes 18 which extend to the steam chests. The pipes 18 connect with the nipples 63 upon the intermediate casting 24, these nipples being hollow and connecting with the opposed ports 64 in the feed cylinder 65. As shown more particularly in Figure 6, the feed cylinder contains the two shut-off blocks or shoes 66 and 67 which slide in the tubular holder 68 and are provided with sockets 69 in their adjacent ends to receive the coil spring 70 by which the blocks are forced outwardly in opposite directions and against the circular wall of the feed cylinder. The blocks fit at their upper ends against a shoulder 71 by which they are partially guided in their circular movement, this shoulder being formed in the feed cylinder just above the point at which the ports 64 are located. The lower edges of the shut-off blocks are received upon the flange 72 of the bottom cover 73 provided with a perforated flange 74 to receive the bolts 75 by which the attachment is made. The cover 73 is provided with the central threaded opening 76 to receive the pipe 17 supplying boiler steam to the feed cylinder.

Figure 6:
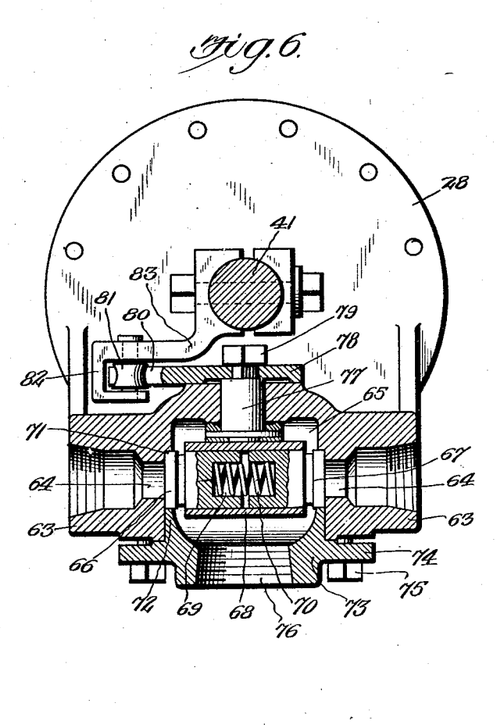
Figure 6 is a vertical central cross sectional view taken on the line 6—6 in Figure 4.

The block holder 68 is supported by the shut-off blocks, the blocks resting on shoulder 71 and flange 72 and held centrally by a post 77 extending up through the top of the feed cylinder.

The upper portion of the turning post 77 receives the lever 78 and the arm is made fast to the post by appropriate connection, for instance by fitting a square opening in the arm over a correspondingly formed section of the post and employing a nut 79 to hold the arm in place. The free end of the lever 78 is slotted or bifurcated as indicated at 80 to receive the roller 81 held beneath the forked end 82 of the arm 83 which is carried by the intermediate part of the piston rod 41.

Figure 7:
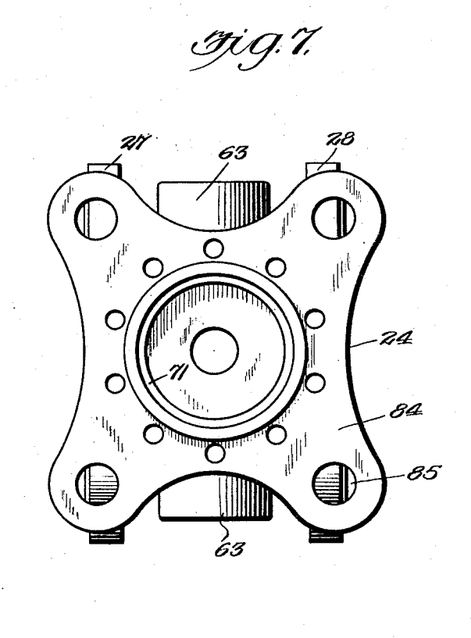
Figure 7 is a bottom plan view of the central casting with the cover plate removed.

As shown in Figure 7 the base 84 of the central casting is relatively wide and provided with the perforated corner lugs 85 to receive bolts or other fastening means whereby the appliance may be affixed to the saddle or other appropriate part of a locomotive.

Figures 3, 9:
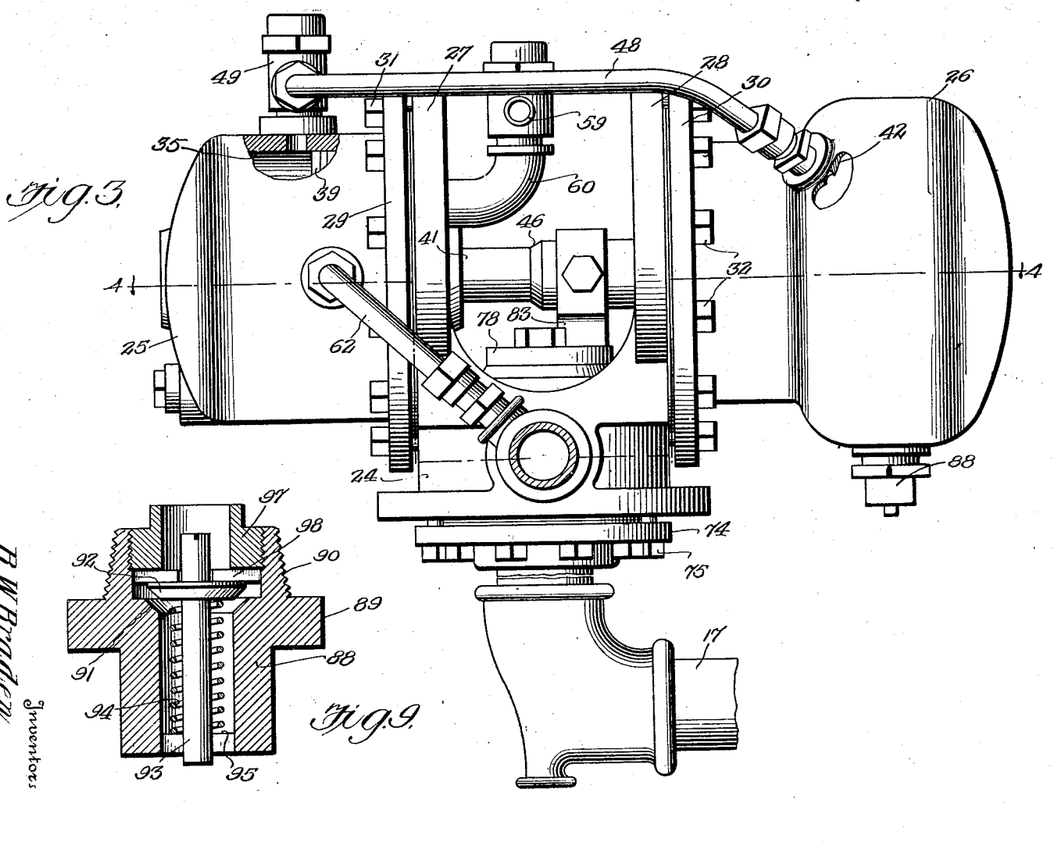
Figure 3 is a side view of the same with parts broken away and parts shown in section.
Figure 9 is a vertical section taken through the condensation check.

The steam pressure chamber 42 is provided with a condensation check, and secured in the bottom thereof, this condensation check being shown more particularly in Figures 9, 10 and 11. The check comprises a casing 88 with a nut 89 on the intermediate part thereof to turn the threads 90 on the upper part thereof into the bottom threaded opening on the reservoir 87. In the intermediate part of the casing is the valve seat 91 cooperating with the disc valve 92 upon the valve stem 93 which reciprocates in the substantially vertical direction. The valve is normally held elevated from the seat by the coil spring 94 wound about the lower portion of the stem and resting upon the lower wall 95. This lower wall, as shown in Figure 10 is slotted diametrically, the slot being indicated at 96. The intermediate part of the slot is enlarged at opposite sides to receive and guide the valve stem 93.

Figure 11 shows the under side of the nut 97 which is screwed into the upper portion of the valve casing. This nut is hollow and is provided with lateral channels 98 leading outwardly beyond the edge of the valve and downwardly through the lower edge of the nut. The intermediate portions of the channels 98 are also enlarged and rounded as indicated at 99 to form an upper guide for the valve stem 93.

In the operation of the device, saturated steam from the boiler has constant access through the pipe 17 to the feed cylinder 65. Similarly superheated steam from the locomotive steam pipe 14 constantly has access to the outer end of the larger cylinder 35 through the pipe 23. The superheated steam forces the pistons 39 and 40 over to the right position shown in Figure 4 and closes the shut-off blocks 66 and 67 so as to prevent the boiler steam from being circulated by means of the pipes 18 to the locomotive steam chests and cylinders. The locomotive steam chests and cylinders at this time are being furnished with superheated steam, the throttle being open and the locomotive running under steam. The device is thus normally inactive during the running of the locomotive with the throttle open. During this normal running condition superheated steam passes from the outer part of the large cylinder 35 through the pipe 48 to the steam pressure chamber 42 where it accumulates until a substantial balance exists when the check valve 49 closes. If the pressure in the steam pressure chamber 42 attempts to fall, the non-return check valve 49 will open and permit further superheated steam therein in order to maintain a suitable pressure in said steam pressure chamber. This accumulated steam in the steam chamber 42 will not have any effect to move the pistons owing to the fact that the area of the piston 40 is less than that of the piston 39. Until the pressure on the outer face of the larger piston 39 falls, the accumulated or trapped steam in the steam chamber 42 will be ineffective.

So soon, however, as the engineer closes the throttle valve and proceeds to drift, the superheated steam pressure will be withdrawn from the outer face of the large piston 39. The accumulated pressure against the outer face of the smaller piston 40 will immediately come into effect and force the pistons over to the left position shown in Figure 5, at the same time opening the shut-off block and permitting boiler steam to pass out through the pipes 18 to the steam chest and cylinders of the locomotive. This boiler steam serves to break the vacuum tending to occur due to the movement of the locomotive pistons in the cylinders during the drifting of the locomotive. It also keeps the parts moist and warm.

When the smaller piston 40 moves to the inner position, as shown in Figure 5 it exposes a vent 101 in the smaller cylinder whereby the accumulated pressure in the steam pressure chamber 42 may find outlet to the atmosphere but the port is restricted and constantly the reduction in the pressure in the steam chamber 42 will take place only slowly and in other words it will allow ample time before said pressure falls to hold the pistons in the left position to permit an appropriate pressure to be built up in the inner portion of the larger cylinder 35 by the saturated or boiler steam passing from one of the pipes 18 through the pipe 62 and port 61. This pressure will accumulate to the desired degree as the pressure upon the smaller piston diminishes and thus provision is made for insuring that the pistons are held in the proper position and the shut-off blocks open during the drifting of the locomotive. The valve or conical face 46 on the piston rod 41 retains the pressure in the inner end of the larger cylinder 35 until the piston rod is moved again in the opposite direction whereupon it allows of the ready and quick evacuation of the inner part of the larger cylinder. The vent port 101 is so placed that it is not put in communication with the steam or pressure chamber 42 until the smaller piston 40 arrives at the extreme position of its inner movement. Furthermore the accumulated pressure in the pressure chamber 42 does not commence to weaken until the parts are completely moved to the new position and as aforesaid, by virtue of the restricted character of the port or vent, the pressure will exhaust only slowly.

The extension 44 of the piston rod will encounter the stop or abutment 45 before the large piston 39 strikes the inner or central casting. Injury to the piston and to the threads and nut upon the piston rod is thus avoided. Loosening of the piston and nuts and breakage or stripping of the thread is greatly to be guarded against and is accomplished by use of these parts. In moving in the opposite direction the same condition is avoided by the conical surface or valve 46 striking upon the seat of the central casting. The use of the relief valve 59, which communicates by the use of the elbow 60 with the inner space of the larger cylinder is for the purpose of regulating the pressure obtaining therein. For example this check 59 may be set to open at a pressure of from ten to fifteen pounds, which is sufficient to hold the pistons in the open position when the locomotive is drifting.

Relief valve 59 is to keep a sufficient amount of pressure against inner face of large piston and to keep the drifting valve in open position while locomotive is coasting; but as locomotive is coming to a slow speed boiler pressure feeding from drifting valve to steam chest builds up in the steam chest; this pressure backs up in supply pipe 14, enters pipe 23 against outer face of piston 39 overbalancing pressure on the inner face of piston 39 which is held at only 15 lbs. by relief valve 59; thus moving both pistons, unseating valve 46 exhausting pressure around clearance of stem, also closing off port 61, closing shut-off blocks as shown in Figure 4.

If we did not have relief valve 59 to relieve this pressure this pressure would build up to same pressure on both sides of piston 39 and that would make 39 a balanced piston preventing drifting valve from operating when engine comes to stop. Condensation check 88 is placed in chamber 42 to automatically relieve condensation from said chamber. Lubricant is furnished to the moving parts of the drifting valve from the lubricating system of the locomotive through the pipes 22 and 23. The lubricant becomes entrained with the steam and is carried thereby into the two cylinders. The arrangement shown in Figure 1 may be altered to suit the different lubricator systems of the particular locomotives upon which the drifting valves are installed.

The steam pipe 19 shown in Figure 1 is intended to meet the following situation:—

In varying the cut off, the engineer, with high hook up, reduces the port area and retards the flow of the steam from steam chest to the cylinders.

By the use of pipe 19, the saturated steam is supplied directly to the locomotive cylinders 16, this steam not being required to pass through the locomotive steam chest 15 and through the reduced port area of the locomotive valves. In this way a plentiful supply of boiler steam is furnished to the locomotive cylinders by the use of the direct connection 19. At 105 is shown a one way check valve for checking the return of steam through the pipe 18 when the throttle is opened. When the throttle is closed boiler steam comes down through the pipe 18 and divides passing through not only the direct connection 19 also through the one way check valve 105 to the steam chest.

When piston has made 60% of its stroke the steam port in pipe 19 is exposed the moment the piston passes the center of cylinder. Thus steam will be in front and rear of piston at all times.

It is obvious that various changes and modifications may be made in the details of construction and design of the above specifically described embodiment of this invention without departing from the spirit thereof.

What is claimed is:—

1. An improved locomotive drifting valve comprising a feed cylinder in connection with a source of steam supply and in communication with the locomotive steam chest, valve means in said feed cylinder for controlling the supply of steam from said feed cylinder to the steam chest, large and small cylinders, large and small pistons in said cylinders coupled for conjoint movement, means for introducing steam from the locomotive steam pipe to the outer side of the larger piston, a pressure chamber in communication with the outer portion of the smaller cylinder, a connection uncovered by said larger piston when in the inner position thereof for establishing communication between the outer portion of said large cylinder and said pressure chamber, a second connection for delivering steam from said feed cylinder to the inner portion of said larger cylinder only when said valve means is open, said smaller cylinder having a restricted vent to the open atmosphere positioned to be uncovered by said smaller piston when in the inner portion in the cylinder, means for coupling said valve means for movement with said pistons, said pressure chamber having an opening therein, a yieldably seated valve in said opening, a relief valve coupled to the inner portion of said larger cylinder to evacuate any pressure therein above a predetermined minimum, and a valve movable with said pistons seated when the larger piston is in the outer position to retain pressure in the inner part of the larger cylinder, but opened to permit the escape of the pressure when the larger piston is moved from such outer position.

2. An improved locomotive drifting valve comprising a feed cylinder in connection with a source of steam supply and in communication with the locomotive steam chest, valve means in said feed cylinder for controlling the supply of steam from said feed cylinder to the steam chest, large and small cylinders, large and small pistons in said cylinders coupled for conjoint movement, means for introducing steam from the locomotive steam pipe to the outer side of the larger piston, a pressure chamber in communication with the outer portion of the smaller cylinder, a connection uncovered by said larger piston when in the inner position thereof for establishing communication between the outer portion of said large cylinder and said pressure chamber, a second connection for delivering steam from said feed cylinder to the inner portion of said larger cylinder only when said valve means is open, said smaller cylinder having a restricted vent to the open atmosphere positioned to be uncovered by said smaller piston when in the inner portion in the cylinder, means for coupling said valve means for movement with said pistons, means coupled to the inner portion of said larger cylinder whereby to maintain a predetermined pressure therein, and means for rapidly evacuating the inner portion of the larger cylinder when the larger piston moves inwardly.

3. An improved locomotive drifting valve comprising large and small cylinders, large and small pistons in said cylinders coupled for conjoint movement, means for introducing steam from the locomotive steam pipe to the outer side of the larger piston, a pressure chamber in communication with the outer portion of the smaller cylinder, a connection uncovered by said larger piston when in the inner position thereof for establishing communication between the outer portion of said large cylinder and said pressure chamber, a second connection for delivering steam to the inner portion of said larger cylinder, said smaller cylinder having a restricted vent positioned to be uncovered by the smaller piston when in the inner position, means opened and closed by the movement of said pistons for admitting in one position boiler steam to the locomotive steam chests and cylinders and also to the inner portion of the larger cylinder through said second connection and in the other position for cutting off boiler steam from the locomotive steam chests and cylinders and from the inner portion of said larger cylinder, relief means for evacuating the pressure in the inner portion of said larger cylinder beyond a predetermined maximum, and valve means opened and closed by the movement of said pistons for rapidly evacuating the inner portion of said larger cylinder.

In testimony whereof we affix our signatures.

RICHARD W. BRADEN.
CHARLES STERN.